United States Patent
Zheng et al.

(10) Patent No.: US 11,941,383 B1
(45) Date of Patent: Mar. 26, 2024

(54) COMPILATION WITH CACHING OF CODE ANALYSIS RESULT

(71) Applicant: Amazon Technologies, Inc., Seattle, WA (US)

(72) Inventors: Hongbin Zheng, San Jose, CA (US); Pushkar Ratnalikar, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 17/654,059

(22) Filed: Mar. 8, 2022

(51) Int. Cl.
  *G06F 8/41* (2018.01)
(52) U.S. Cl.
  CPC .............. *G06F 8/443* (2013.01); *G06F 8/427* (2013.01)
(58) Field of Classification Search
  CPC .................................. G06F 8/443; G06F 8/427
  See application file for complete search history.

(56) References Cited

U.S. PATENT DOCUMENTS

| | | | | |
|---|---|---|---|---|
| 2016/0110171 A1* | 4/2016 | Bikshandi | ............... | G06F 7/556 717/160 |
| 2019/0042224 A1* | 2/2019 | Caballero De Gea | .. | G06F 8/447 |

OTHER PUBLICATIONS

Y. Xing, J. Weng, Y. Wang, L. Sui, Y. Shan and Y. Wang, "An In-depth Comparison of Compilers for Deep Neural Networks on Hardware," 2019 IEEE International Conference on Embedded Software and Systems (ICESS), Las Vegas, NV, USA, 2019, pp. 1-8 , doi: 10.1109/ICESS.2019.8782480. (Year: 2019).*

\* cited by examiner

*Primary Examiner* — Hanh Thi-Minh Bui
(74) *Attorney, Agent, or Firm* — Weaver Austin Villeneuve & Sampson LLP

(57) ABSTRACT

Techniques to speed up code compilation may include caching code analysis results such that the analysis of subsequent code having a similar structured can be omitted. For example, a loop-nest construct in the code can be parsed, and an execution statement in the loop-nest construct can be analyzed by a compiler to generate an analysis result indicating a set of execution conditions for the execution statement. A lookup key can be generated from the control statements bounding the execution statement, and the analysis result can be stored with the lookup key in a cache entry of the cache. The execution statement is then modified according to the analysis result for optimization. Instead of having to analyze a subsequent execution statement bounded by the same control statements, the analysis result of the subsequent execution statement can be retrieved from the cache and be used to modify the subsequent execution statement.

20 Claims, 14 Drawing Sheets

```
200

D1:   int arr1[1024][1024];
D2:   int arr2[1024][512];
C1:   for (int i=0; i<1024; ++i) {
C2:     for (int j=0; j<1024; ++j) {
C3:       if (j<512) {
S1:         arr1[i][j] = i*j;
S2:         arr2[i][j] = (i*j)+1;
          }
C4:       if (j≥512) {
S3:         arr1[i][j] = i+j;
          }
        }
      }
```

⇧

```
600

D1:   int arr1[1024][1024];
D2:   int arr2[1024][512];
C1:   for (int i=0; i<1024; ++i) {
C2:     for (int j=0; j<1024; ++j) {
S1':      arr1[i][j] = i*j if (j<512);
S2':      arr2[i][j] = (i*j)+1 if (j<512);

S3':      arr1[i][j] = i+j if (j≥512);
        }
      }
```

Figure 7:
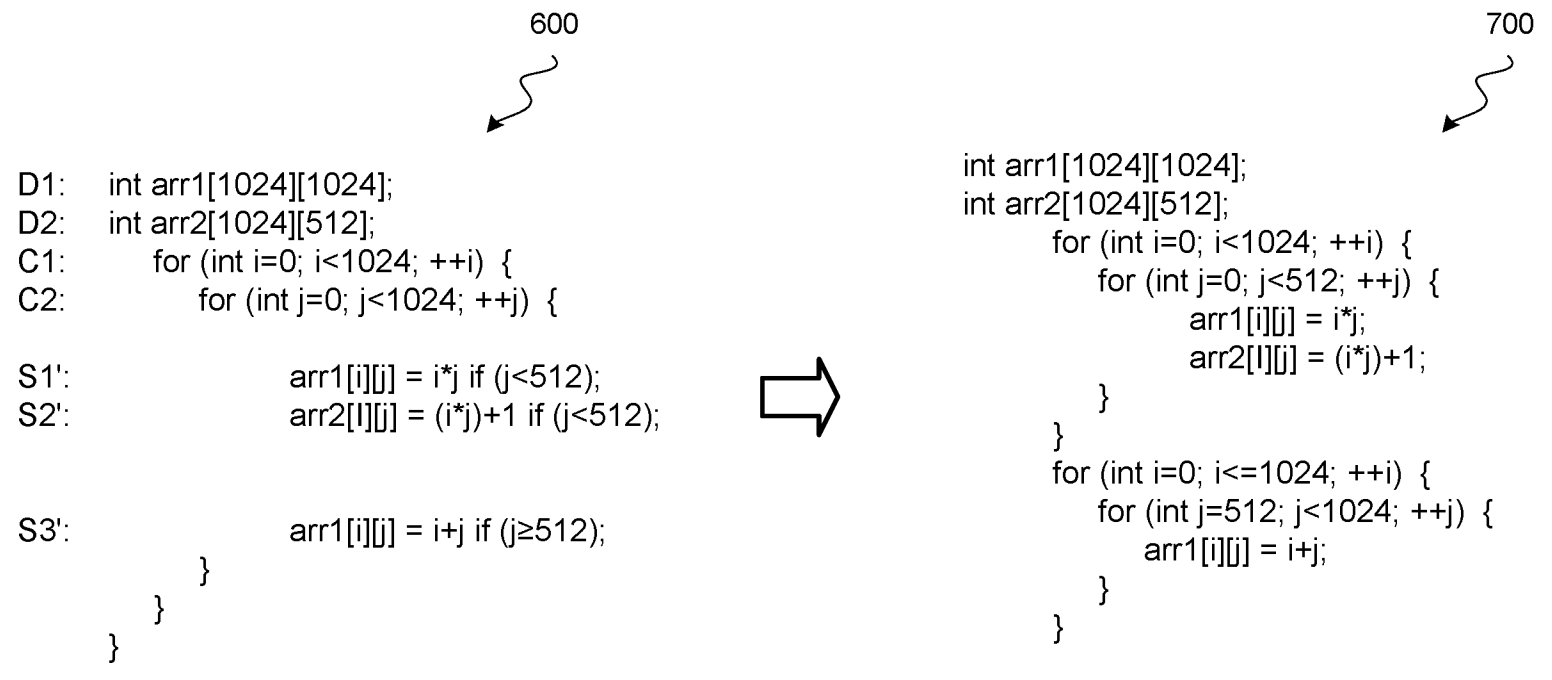

```
D1:   int arr1[1024][1024];
D2:   int arr2[1024][512];
C1:   for (int i=0; i<1024; ++i) {
C2:     for (int j=0; j<1024; ++j) {
S1':    arr1[i][j] = i*j if (j<512);
S2':    arr2[i][j] = (i*j)+1 if (j<512);
S3':    arr1[i][j] = i+j if (j≥512);
      }
    }
```

⇩

700

```
int arr1[1024][1024];
int arr2[1024][512];
for (int i=0; i<1024; ++i) {
  for (int j=0; j<512; ++j) {
    arr1[i][j] = i*j;
    arr2[i][j] = (i*j)+1;
  }
}
for (int i=0; i<=1024; ++i) {
  for (int j=512; j<1024; ++j) {
    arr1[i][j] = i+j;
  }
}
```

COMPILATION WITH CACHING OF CODE ANALYSIS RESULT

BACKGROUND

Neural networks utilize computational models to perform complex tasks such as image recognition, natural language processing, among others. A neural network can perform computations using a set of weights. Through these computations, the weights are combined with input data (which can also be referred to as feature maps) through multiple layers to perform an inference operation. Some neural network models such as deep learning models can have millions of operations to perform complex computations.

BRIEF DESCRIPTION OF THE DRAWINGS

Various embodiments in accordance with the present disclosure will be described with reference to the drawings, in which:

FIG. 6 illustrates an example of code modification;

FIG. 7 illustrates another example of code modification;

DETAILED DESCRIPTION

Complex neural networks can include millions of parameters and operators. Compiling a model of such magnitude from source code written in a programming language into compiled code executable on hardware can be a time-consuming process. A typical operator for neural networks can include several layers of nested loops. When compiling the loop-nest construct, each execution statement in the loop-nest is analyzed to determine how the execution statement can be transformed and optimized in the context of the loop-nest. Repeating such analysis for millions of operators may take days for the compilation to complete.

To reduce the compilation time, the techniques disclosed herein caches the analysis result of execution statements in loop-nest constructs such that the analysis performed by the compiler for statements with similar execution conditions need not be repeated. For example, the compiler may analyze an execution statement to determine the iteration space of the statement. Execution statements that are subject to the same iterator boundaries and predicates will have the same iteration space. By caching the analysis result of an execution statement, the analysis for subsequent execution statements subject to the same execution conditions can be omitted, because the analysis result can be retrieved from the cache. To further reduce the compilation time, the cache can utilize a least recently used (LRU) cache policy. A LRU cache is a data structure which is optimized for fast retrieval of values which have been recently stored as opposed to values stored earlier. Since statements belonging to the same basic block are analyzed and transformed sequentially, the use of LRU cache can significantly speedup the fetching of the cached analysis results.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
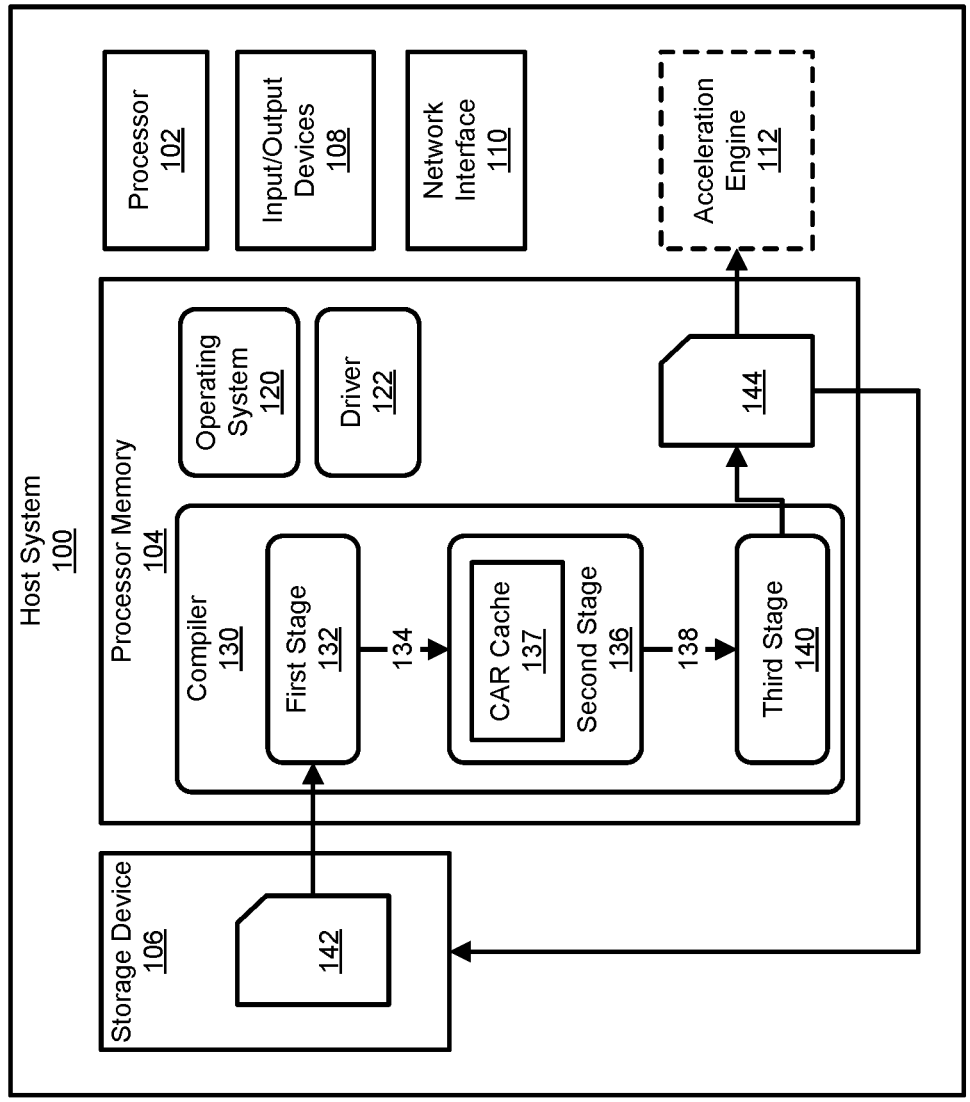
FIG. 1 illustrates a block diagram of an example of a compiler in a host system.

FIG. 1 illustrates a block diagram of an example of a host system 100 on which a compiler 130 can run. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as being performed or included in the host system 100 can be performed or included in other computer devices. For example, the compiler 130 can execute on the host system 100 while the acceleration engine 112 is located in a different host system or different computing device.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data that the processor 102 is operating on. In various examples, the processor memory 104 is a volatile memory type, such as a type of random access memory, though non-volatile memory types can, alternatively or additionally, be used for the processor memory 104.

The storage device 106 is an example of a device that can include non-volatile memory. For example, the storage device 106 can be a magnetic disk drive, a solid-state drive, or an optical drive, among other examples. Program code and other data stored on the storage device 106 can remain present when the storage device 106 is not powered on. Storage device 106 can be uses as a type of non-transitory storage medium, or may include a reader that can access non-transitory storage medium.

The storage device 106 is one example of a peripheral device. A peripheral device is a component that can be coupled to the host system 100 to add functionality to the host system 100. Other examples of peripheral devices include Input/Output devices 108 and network interface 110.

The Input/Output devices 108 can include user input and/or output devices, such as keyboard, mouse, pointer, touchpad, touchscreen, microphone, display screen, speaker, printer, and scanner, among other examples. Network interface 110, which can be implemented using a network interface card, can provide access to one or more networks. Network interface 110 can include, for example, a physical port for connecting a network cable and/or one or more antennas and/or radios for wireless communication such as Wi-Fi, cellular, and/or other over-the-air networks. Network interface 110 can also be described as an I/O device.

The acceleration engine 112 is also another type of peripheral device or I/O device. The acceleration engine 112 is a device that is purpose-built to perform certain operations that can be performed by the processor 102, but can be performed faster by the acceleration engine 112. For example, the acceleration engine 112 can be a neural network accelerator that is capable of performing large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network model, such as one that performs image recognition or one that performs machine translation. As a further example, to support the execution of a neural network model, the acceleration engine 112 can be programed to perform operations such as copying data for the neural network between processor memory 104 and the acceleration engine 112 (e.g., copying input data for the neural network from processor memory 104 into the acceleration engine 112, copying results from the acceleration engine 112 into the processor memory 104, etc.).

To generate program code for the acceleration engine 112, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 can be a neural network accelerator, and the compiler 130 can be a compiler for compiling a neural network description into instructions to be executed by the acceleration engine 112. When the acceleration engine 112 implements a different type of accelerator, a different compiler can be used.

The compiler 130 can be activated, for example, when the operating system 120 receives keyboard, mouse, touchscreen, voice command, or other inputs from the Input/Output devices 108. The inputs can further include parameters for the compiler 130, such as input code 142 to compile and configuration options for the compilation process. Once the compiler 130 is activated, the processor 102 can load the instructions for the compiler 130 into the processor memory 104, and execute the compiler from the processor memory 104. In some implementations, compiler 130 may identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

In the example of FIG. 1, the compiler 130 includes a first stage 132, a second stage 136, and a third stage 140, which each perform different operations to produce compiled code 144. In other examples, the compiler 130 can combine the operations of the first stage 132, second stage 136, and/or third stage 140 into fewer stages, or can divide the operations of one or more of the stages into multiple stages. In some implementations, compiler 130 can also be modified such that certain operation(s) from one stage can be executed in a different stage.

The first stage 132 (may also be referred to as the front stage) can receive and process input code 142. The input code 142 can describe a program in a high-level programming language, such as Python, Java, C++, among other examples, and may utilize software libraries tailored for neural networks such as TensorFlow, PyTorch, etc. The input code 142 can be a description of a neural network model that describe, for example, steps to perform image recognition, speech recognition, machine translation, or other operations. The input code 142 can be obtained from the storage device 106. Alternatively, though not illustrated, the input code 142 can be located in the processor memory 104, or can be obtained from a network location using the network interface 110.

Processing of the input code 142 can include parsing the input code 142, performing syntax and semantic analysis on the input code 142 to identify operators (e.g., operations such as computations, memory accesses, and/or other functions, etc.) described in the input code 142, and sorting the operators described in the input code 142. For example, the operators described in the input code 142 can be sorted into layers, where the outputs of one layer provide the inputs to a next layer. The output of the first stage 132 can be an intermediate representation (IR) 134 of the input code 142. In some implementations, the IR 134 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 136 (may also be referred to as the middle-end stage) can perform intermediate processing on the IR 134 output from the first stage 132. The intermediate processing may include performing various code analyses and optimizations on the IR 134. In some implementations, a code analyses result (CAR) cache 137 can be implemented to reduce the amount of code analyses to speed up the compilation process. The operation of the CAR cache 137 will be described further below.

The optimizations performed by the second stage 136 may include target independent optimizations that are hardware agnostic, and/or target specific optimizations that are tailored for the hardware architecture executing the program of input code 142. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 112) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 112 to perform at the same time. The acceleration engine 112 may, for example, have a limited amount of local storage space for the data needed for a computation, or the computations may be more than the acceleration engine 112 can perform at one time. In such scenario, the operators of the layer or node can be broken down into smaller operations, which can fit into the acceleration engine's local memory and/or can fit into the computing capacity of the acceleration engine 112. The output of the second stage 136 can be an optimized IR 138 such as code representing an optimized compute graph.

The third stage 140 (may also be referred to as the back-end stage) can operate on the output 138 of the second stage 136, and perform various steps before producing the instructions (e.g., machine code) that are to be executed by the acceleration engine 112. These steps can include instruction and data scheduling, register allocation, and/or code generation. Instruction and data scheduling determines the order in which instructions are executed and data are processed by the acceleration engine 112, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 112, and includes mapping operations into hardware instructions according to the architecture of the acceleration engine 112. The output of the third stage 140 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network model that the acceleration engine 112 is to execute, as well as the location in the processor memory 104 or on the storage device 106 where the compiled code 144 for the neural network model is located. The driver 122 can further load into the acceleration engine 112 or cause the acceleration engine 112 to load the compiled code 144, can load or cause the acceleration engine 112 to load the input data on which the neural network model is to operate, and/or can cause the acceleration engine 112 to being executing on the input data. Once the acceleration engine 112 has finished, the acceleration engine 112 can notify the driver 122, and the driver 122 can deliver a result back to the application that requested the result.

In some implementations, compiler 130 may utilize a polyhedral compilation model, which is a compiler analysis and transformation scheme that can be used to optimize complex loops. Operators in neural network models are often represented using affine loop-nests, which are loops having loop bounds and array references being affine functions (linear functions plus a constant) of loop iterators and program parameters. Such loop-nests can be modeled as polyhedra and/or Presburger relations, and combinatorial and geometrical optimizations on these objects are used to analyze and optimize the programs. Some common affine analyses are iteration-domain analysis, data footprint analysis, predicate simplification, etc. and the optimizations include auto-parallelization, data locality optimizations, memory management optimizations, program verification, communication optimizations, single instruction multiple data (SIMD) vectorization, code generation for hardware accelerators, high-level synthesis, etc.

Polyhedral model-based compilation employs integer linear programming (ILP) for many of these analyses. ILP is a computationally expensive technique. Complex neural network models can have millions of operators that translate to an extremely large number of loops. As mentioned above, during compilation, each statement inside the loops is analyzed. This can lead to prohibitively long compilation times, resulting in some developers forgoing certain optimization options in order to keep the compilation time reasonable.

In many cases, the results of analysis can be reused, as a lot of operators in the same model have the same shape and access-patterns. For example, execution statements belonging to the same basic blocks can share the result of analysis. If the analysis has already been done for one statement of the loop, it need not be repeated for the other statements on the same loop at the same level. As such, a code analysis result (CAR) cache can be used to cache the results of the affine analysis and reuse them for other statements on the same loop body.

In some implementations, a least recently used (LRU) cache policy can be utilized to further speed up retrieval of the analysis results. A LRU cache is a data structure which is optimized for fast retrieval of values which have been recently stored as opposed to values stored earlier. Since, statements belonging to the same basic block are analyzed and transformed sequentially, the use of LRU cache can significantly speed up the fetching of cached results. This can provide additional reduction in the compilation time. To illustrate the code analysis result caching technique, an explanation of the technique will be described below with reference to a code analysis being performed on a snippet of an example code.

Figure 2:
FIG. 2 illustrates an example of a code snippet.

FIG. 2 illustrates a snippet 200 of an example program code (e.g., code implementing a neural network model). It should be understood that snippet 200 is merely an example to illustrate the techniques disclosed herein, and that actual snippets and code of a neural network model can take on other forms, expressions, and/or statements. During compilation, snippet 200 is parsed to identify the various types of statements in the code. For example, the types of statements that can be included in the code may include declaration statements that are used to instantiate variables and/or data structures, control statements that are used to control the flow of execution, and execution statements that perform certain functions such as computations and/or memory accesses.

Referring to FIG. 2, snippet 200 may include two declaration statements D1 and D2 to instantiate arrays arr1 and arr2, respectively. Snippet 200 may also include two loop control statements C1 and C2, which form a nested loop or a loop-nest construct, and two predicate control statements C3 and C4, which gate execution of the respective bounded execution statements. Snippet 200 further includes execution statements S1, S2, and S3. Execution statements S1 and S2 are bounded by control statements C1, C2, and C3, and execution statement S3 is bounded by control statement C1, C2, and C4. In the example shown in FIG. 2, execution statements S1, S2, and S3 are each memory access statements that writes the result of a computation to a memory location. Execution statements S1 and S3 each writes to array arr1, and execution statement S2 writes to array arr2.

Figure 3:
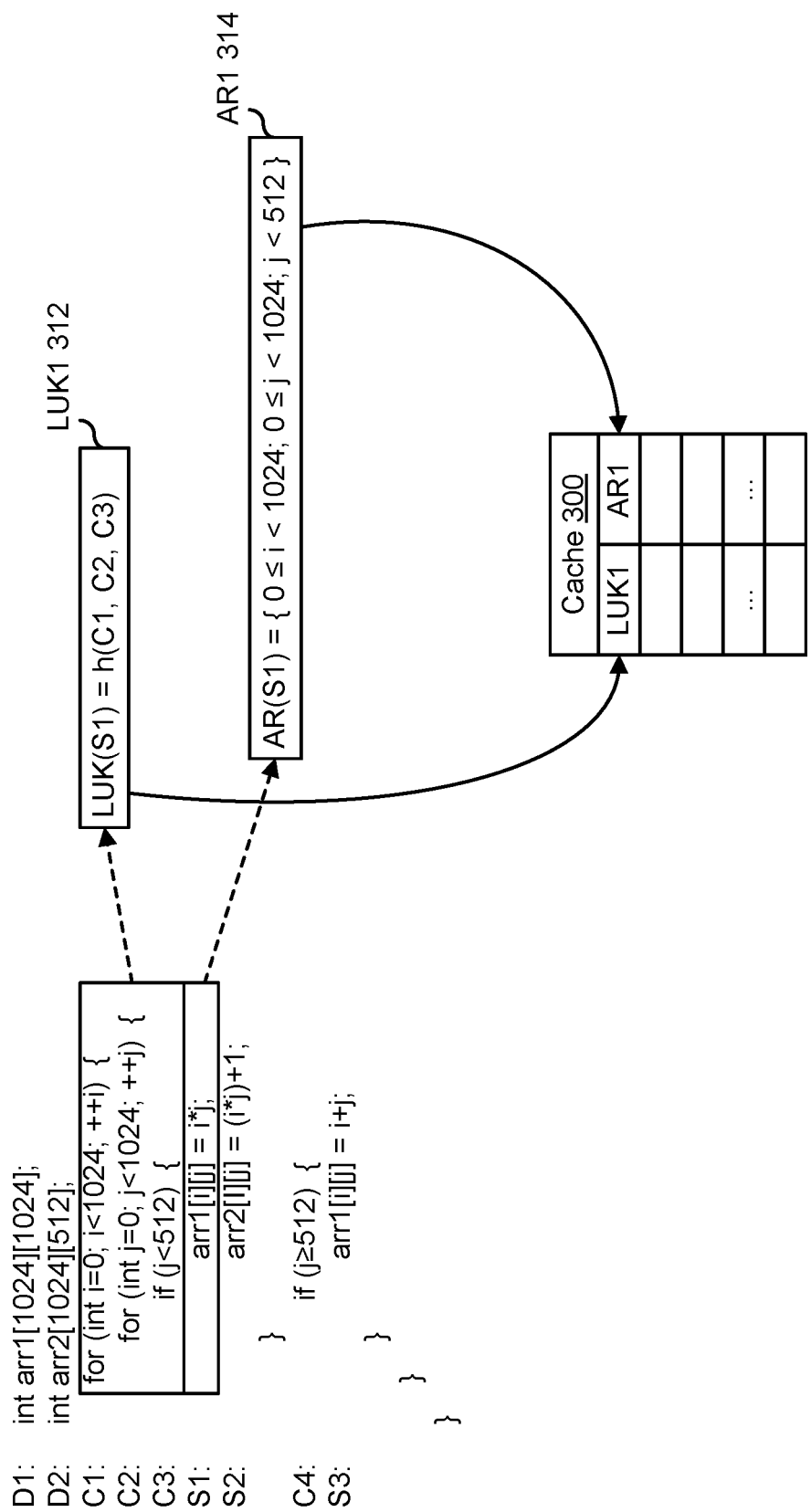
FIG. 3 illustrates an example of caching an analysis result.

FIG. 3 illustrates an example of code analysis being performed on execution statement S1 of snippet 200. The code analysis being performed on execution statement S1 may determine, for example, the execution conditions of execution statement S1, such as the iteration space of execution statement S1. In some implementations, when the loop-nest being analyzed is an affine loop-nest, the code analysis may be referred to as an affine analysis. The code analysis may determine the control statements that bound execution statement S1, and obtain the boundaries of the loop iterator variables and any predicates gating the execution of execution statement S1. The code analysis result may indicate that execution statement S1 is bounded by i ranging from 0 up to but not including 1024 with a stride of 1, a second loop with iteration variable j ranging from 0 up to but not including 1024 with a stride of 1, and a predicate with variable j being less than 512. The analysis result can be represented as a set of algebraic inequalities. For example, the analysis result of executions statement AR(S1) can be represented using the inequalities: $\{0 \leq i < 1024; 0 \leq j < 1024; j < 512\}$.

To speed up the compilation time and avoid repeating the above analysis for subsequent execution statements, this analysis result AR1 314 for execution statement S1 can be stored in a cache 300 implementing a code analysis result (CAR) cache. In some implementations the inequalities of AR(S1) above can be stored as is, or a simplification or reduction of the inequalities can be stored. For example, the inequalities of AR(S1) can be reduced to: $\{0 \leq i < 1024; 0 \leq j < 512\}$, and the simplified inequalities can be stored in cache 300. The lookup key for the cache entry can be generated as a function of the control statements bounding the execution statement. For example, the lookup key LUK1 312 for the analysis result AR1 314 of execution statement S1 can be generated using a key generation algorithm such as a hash algorithm (e.g., secure hash algorithm 256 (SHA-256), or other suitable algorithm) computed over control statements C1, C2, and C3.

It should be noted that cache 300 may utilize a least recently used (LRU) cache policy to evict the least frequently used cache entry first. For example, cache 300 can be implemented using a queue structure in which a new entry is stored at the top of the queue while older entries are shifted downwards in the queue order. When the queue becomes full and a new entry is to be stored, the oldest entry at the bottom of the queue can be evicted. Because the code analysis is performed sequentially and execution statements bounded by the same set of control statements are typically grouped together, by implementing a LRU cache, it is likely that a cache hit will result in a cache entry at or near the top of the queue to reduce the cache search and access time. It should be understood in other implementations, cache 300 can be implemented using other data structures and/or use other cache policies.

Figure 4:
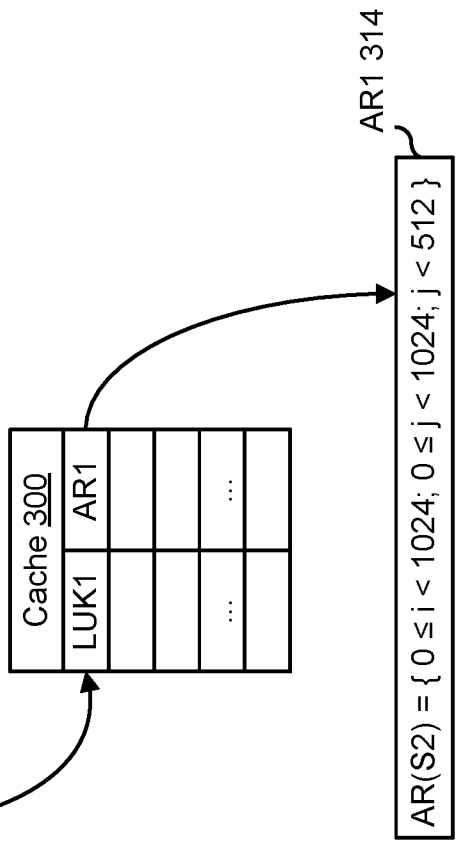
FIG. 4 illustrates an example of retrieving a cached analysis result.

Referring now to FIG. 4, after performing the analysis on execution statement S1, the compiler moves on to the next execution statement S2 for evaluation. The compiler generates a lookup key from the control statements bounding execution statement S2. In this example, the control statements bounding execution statement S2 are control statements C1, C2, and C3. The lookup key LUK(S2) for execution statement S2 is thus generated using the key generation algorithm (e.g., a hash function such as SHA-256) computed over the control statements C1, C2, and C3. Since the control statements for execution statement S2 are the same as the control statements bounding execution statement S1, the lookup key LUK(S2) will have the same value as the lookup key LUK1 312 for execution statement S1.

The compiler can then determine if any entry in cache 300 contains the lookup key LUK1 312. As shown in FIG. 4, cache 300 already has an entry with the lookup key LUK1 312. As such, instead of performing the code analysis on execution statement S2, the analysis result AR1 314 can be retrieve from the cache entry using lookup key LUK1 312, and be applied to execution statement S2. In other words, the execution conditions such as the iteration space for execution state S2 can be obtained from cache 300 without having to perform the analysis again on execution statement S2. In the example shown, the iteration space of execution statement S2 can be determined as the iteration space represented by the set of inequalities: $\{0 \leq i < 1024; 0 \leq j < 1024; j < 512\}$, which is the analysis result AR1 314 retrieved from cache 300 at the cache entry associated with lookup key LUK1 312.

Figure 5:
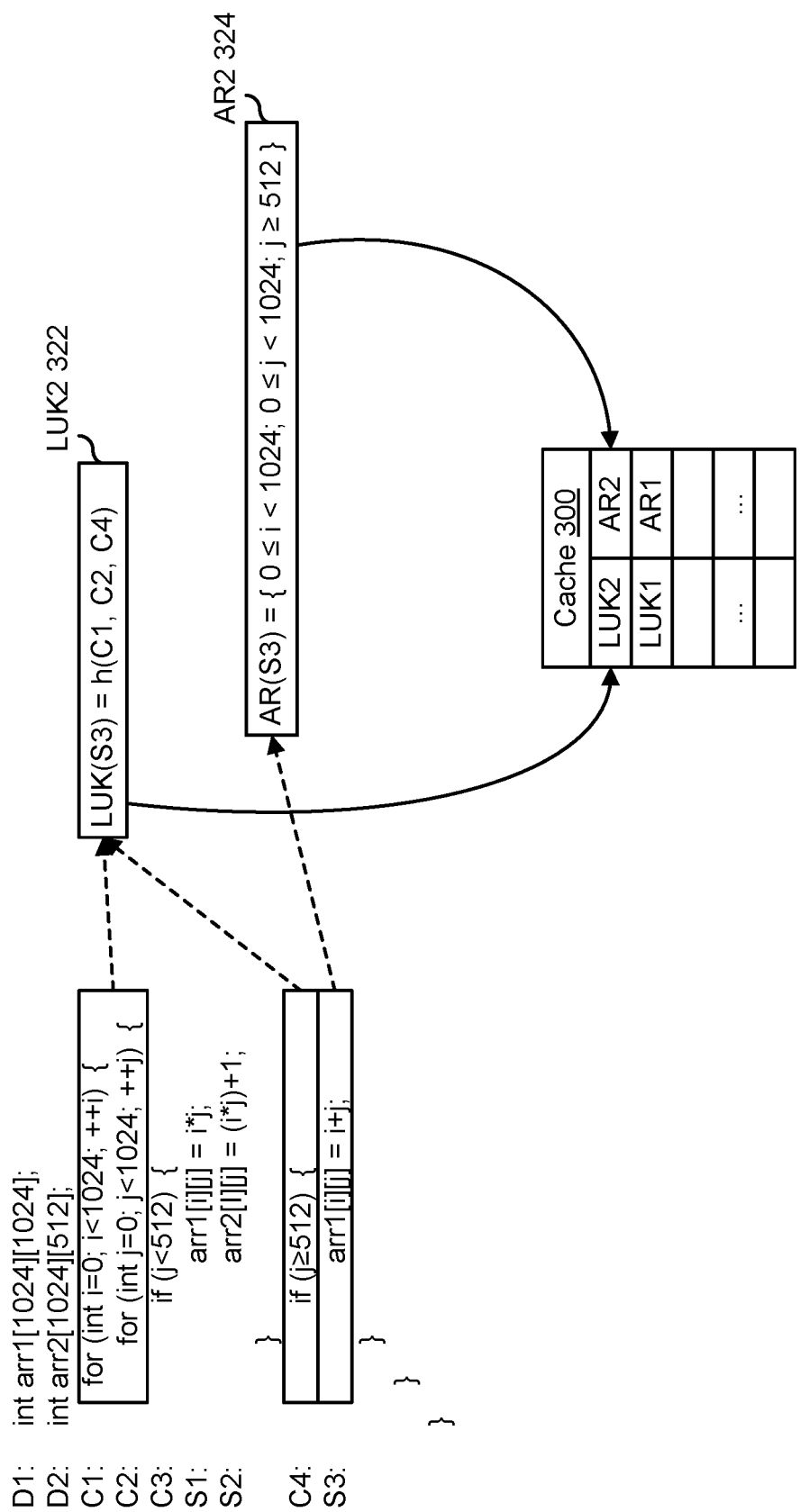
FIG. 5 illustrates an example of caching another analysis result.

Referring now to FIG. 5, after evaluating execution statement S2, the compiler moves on to the next execution statement S3 for analysis. The compiler generates a lookup key from the control statements bounding execution statement S3. In this example, the control statements bounding execution statement S3 are control statements C1, C2, and C4. The lookup key LUK(S3) for execution statement S3 (LUK2 322), is thus generated by applying the key generation algorithm (e.g., a hash function such as SHA-256) to the control statements C1, C2, and C4. Since this is the first execution statement bounded by this particular set of control statements, the lookup key LUK2 322 generated for execution statement S3 will result in a cache miss. Because cache 300 does not contain a cache entry with the lookup key LUK2 322, code analysis (e.g., affine analysis) is performed on execution statement S3 to obtain the execution conditions of the statement.

The code analysis may determine the boundaries of the loop iterator variables and any predicates gating the execution of execution statement S3. The code analysis result may indicate that execution statement S3 is bounded by a first loop with variable i ranging from 0 up to but not including 1024 with a stride of 1, a second loop with variable j ranging from 0 up to but not including 1024 with a stride of 1, and a predicate with variable j being greater than or equal to 512. The analysis result can be represented as a set of algebraic inequalities. For example, the analysis result AR2 324=AR (S3) for executions statement S3 can be represented using the inequalities {0≤i<1024; 0≤j<1024; j≥512}.

To speed up the compilation time and avoid the repeating the above analysis for subsequent execution statements subject to the same control statements, analysis result AR2 324 for execution statement S3 can be stored in cache 300 with lookup key LUK2 322 as a new cache entry. As discussed above, cache 300 can be implemented as a LRU cache. In such scenarios, the new entry with LUK2 232 and AR2 324 can be stored at the top of the queue, and older entries such as the cache entry containing LUK1 are shifted down the queue.

FIGS. 6-7 illustrate examples of code optimization that can be performed for snippet 200 using the code analysis and caching technique described above. Referring to FIG. 6, the snippet 200 annotated with the statement references can be rewritten as code block 600 using predicate simplification. Predicated statements (e.g., if statements) including C3 and C4 are conditional expressions which guard the execution of certain statement. In snippet 200, C3 is the expression that controls the execution of statements S1 and S2, and C4 is the expression that controls the execution of statement S3. The nature of the predicates here means that statements S1 and S2 each executes only 1024×512 times and statement S3 also only executes 1024×512 times, even though the iteration variables i and j are nested over 1024×1024 iterations.

For any arbitrary predicate, the compiler reasons about the statement instances that would be executed at runtime, symbolically, without unrolling the loop. This can be complex if the predicate itself is a function of multiple loop variables in a nested loop. Using the polyhedral compilation model, predicates can be simplified. For example, an execution statement can be tagged with its corresponding predicate expression using if-conversion. This makes the statement itself conditional. As shown in code block 600, execution statement S1 from snippet 200 can be rewritten as S1' by incorporating the predicate of control statement C3. Execution statement S2 from snippet 200 can be rewritten as S2' by incorporating the predicate of control statement C3. Execution statement S3 from snippet 200 can be rewritten as S3' by incorporating the predicate of control statement C4.

Referring to FIG. 7, code block 600 can be further optimized into code block 700. The loop-nest of code block 600 can be rewritten to reflect the true iteration space of the execution statements. As shown in FIG. 7, the inner loop (loop with iteration variable j) of each of execution statements S1', S2', and S3' now has only 512 iterations with S1' and S2' iterating over 0 to less than 512 for variable j, and S3' iterating over 512 to less than 1028 for variable j. The code optimization can be performed, for example, using integer linear programming (ILP) to model the iteration constraints as a linear programming problem.

Rewriting the loop-nests can reduce the compilation time for subsequent compilation steps. For example, when scheduling the instructions and allocating the memory space, loop-nests constructs are unrolled into individual statement instances. By rewriting the loop-nests to reflect the true iteration space, the number of unrolled statements can be reduced to minimize the size of the input provided to these compilation stages. By having less input to process, the compilation time for the subsequent stages can be reduced. The cache technique described herein reduces the code analysis time to provide the code analysis results for optimizations such as those described above, because the analysis performed for one statement can be reused for other statements without having to repeat the analysis.

Figure 8:
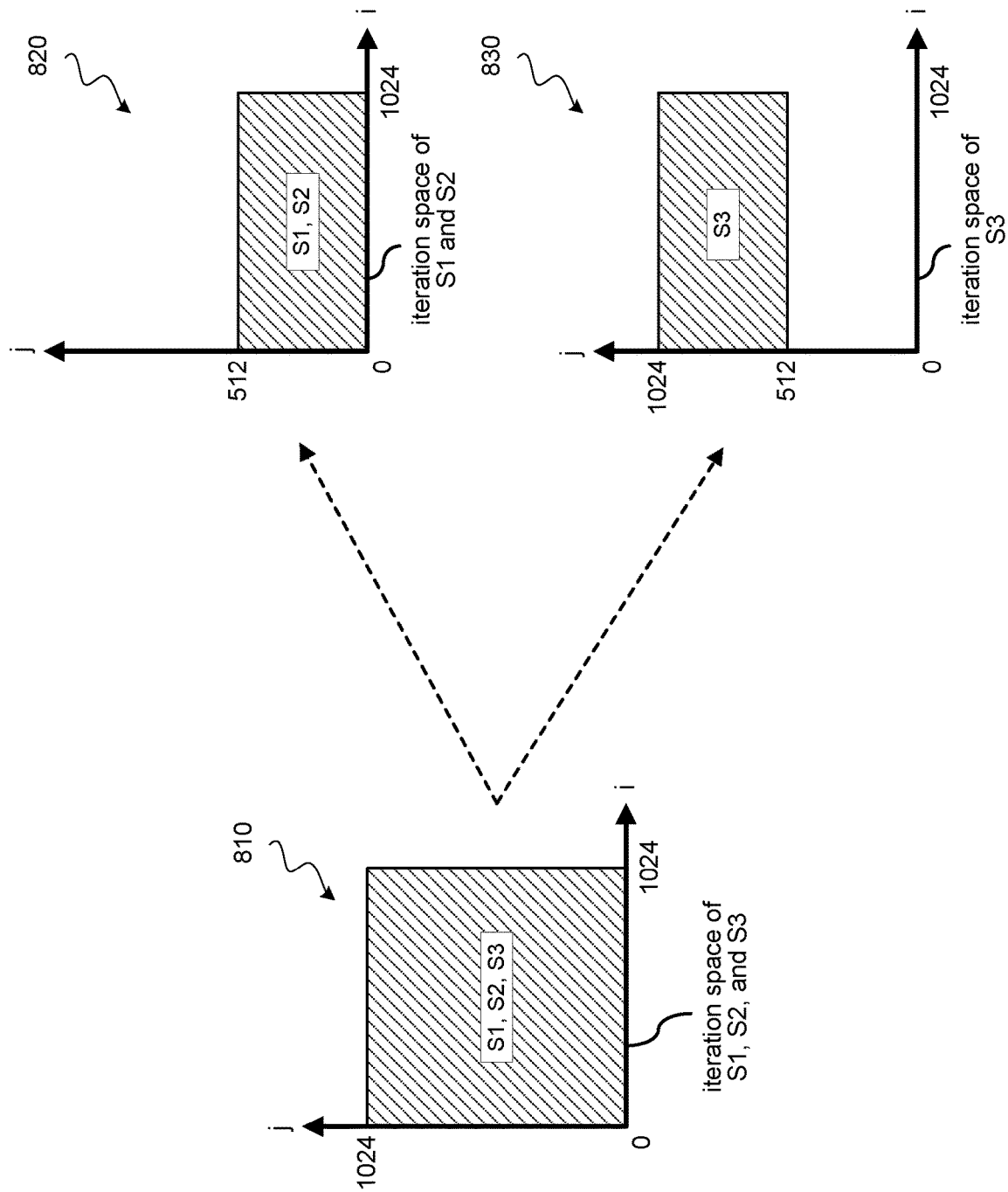
FIG. 8 illustrates an example of iteration space reduction.

FIG. 8 illustrates a conceptual diagram of applying the polyhedral model-based analysis to the iteration space of snippet 200. The polyhedral analysis models the iteration space of a n-deep loop-nest as a n-dimensional convex polyhedron. Optimizations, using this modeling, can include rearrangement of the dynamic instances within the polyhedron. The polyhedral analysis model reasons about the transformed iteration space using Integer Linear Programming (ILP). If the predicate results in fewer dynamic instances of some statement, the loop surrounding those statements can be rewritten. This is usually achieved by re-computing the convex hull over all the dynamic instances. Visually, this can result in a convex polyhedron which is of a lesser volume compared to the original one.

As shown in FIG. 8, the initial iteration space of snippet 200 is a two-dimensional polyhedron because the loop-nest of snippet 200 iterates over two variables i and j. The iteration space can be represented as a square 810 over the range of 0≤i<1024 and 0≤j<1024. It should be understood that in other implementations, the iteration space can be represented with other shapes, depending on the iterator variables and the number of loops in the loop-nest. For example, if the upper bound of the j loop is j≤i, the iteration space will be represented as a triangle. The number of loops in the loop-nest determines the dimensionality of the polyhedron.

Referring to snippet 200, all three execution statements S1, S2, and S3 are bounded by this iteration space in snippet 200 because these execution statements are inside both loops. As explained above, the actual iteration space is smaller because of the predicate expressions. After optimization, the iteration space for execution statements S1 and S2 can be reduced to the rectangular iteration space 820, and the iteration space for execution statement S3 can be reduced to the rectangular iteration space 830. Iteration space 820 shrinks the initial iteration space by half for execution statements S1 and S2 by reducing the iteration space to the range of 0≤i<1024 and 0≤j<512. Iteration space 830 shrinks the initial iteration space by half for execution statement S3 by reducing the iteration space to the range of 0≤i<1024 and 512≤j<1024.

Figure 9:
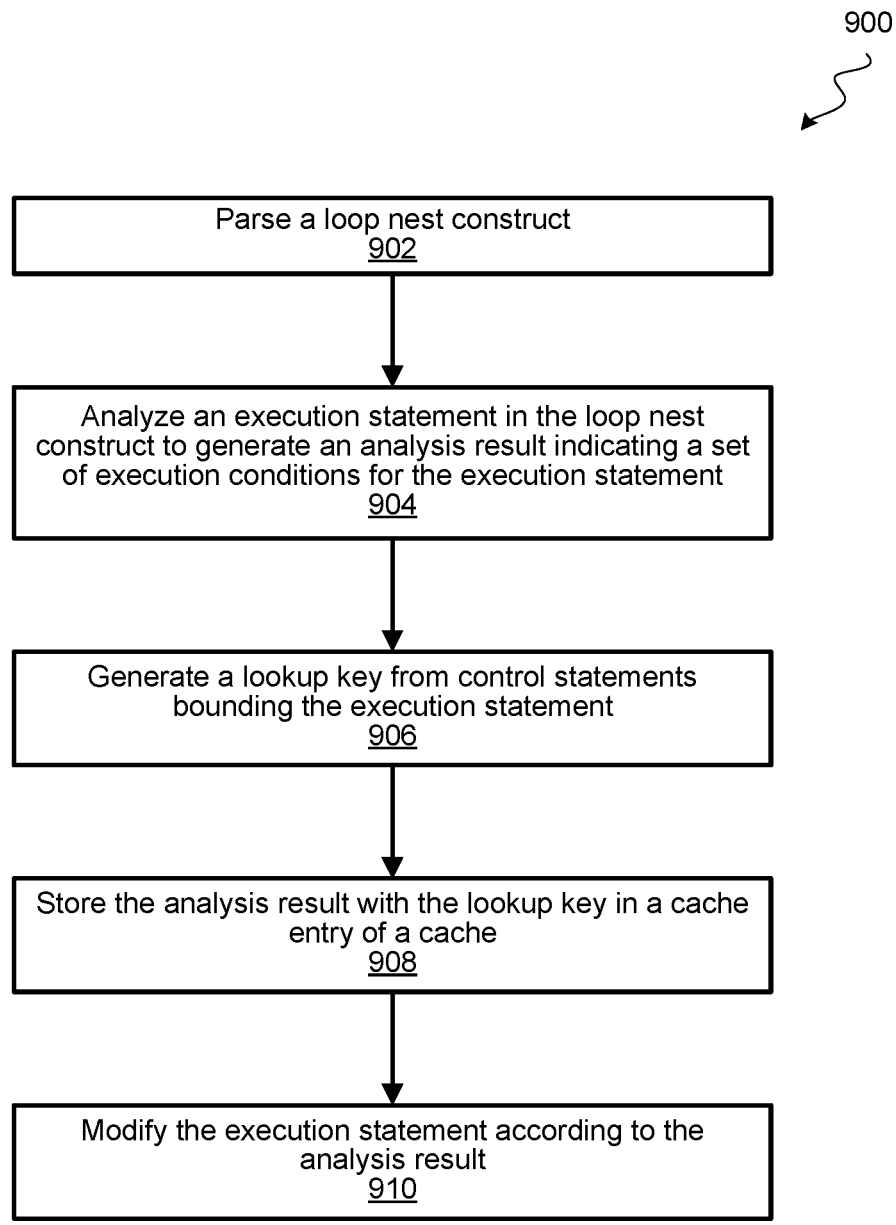
FIG. 9 illustrates a flow diagram of an example of caching code analysis result.

FIG. 9 illustrates a flow diagram of an example of a process 900 for caching code analysis result to improve compilation time. Process 900 can be performed, for example, by a compiler that interprets programming code describing a neural network model, and translates the programming code into machine instructions for execution on hardware (e.g., an integrated circuit device such as an acceleration engine). In some implementations, process 900 can be implemented on a computer-readable medium that is executable by one or more processors of a computing system to compile the programming code of a neural network model for loading onto the integrated circuit device for execution.

Process 900 may begin at block 902 by parsing a loop-nest construct from a code block. The code block can be, for example, part of an intermediate representation of a neural network model. The intermediate representation can be code and/or data structures generated from a description of a neural network model. The loop-nest construct can be parsed to identify control statements and execution statements within the loop-nest construct. Control statements may include loop statements, predicate statements, etc. Execution statements may include memory access statements, computations, data transformation operations, etc., and/or combinations thereof.

At block 904, an execution statement in the loop-nest construct is identified and analyzed to generate an analysis result indicating a set of execution conditions for the execution statement. The analysis can be performed, for example, using a polyhedral based analysis in which a loop iteration space of a n-deep loop-nest is modeled as a n-dimensional convex polyhedron. When the loop-nest construct is an affine loop-nest, the analysis result may be referred to as an affine analysis result. The set of execution conditions may indicate, for example, an iteration space of the execution statement, and may include one or more sets of iteration parameters and/or one or more predicate conditions. The iteration space can be expressed as a set of inequalities defining the boundaries and strides of the iteration parameters and predicate conditions.

At block 906, a lookup key is generated from the control statements bounding the execution statement. The control statements may include loop statements and any predicate statements that control the execution of the execution statement. The lookup key can be generated by applying a key generation algorithm to the control statements that the execution statement is subjected to. The key generation algorithm can be, for example, a hash algorithm such as SHA-256. Execution statements that are bounded by the same set of control statements are expected to have the same lookup key.

At block 908, the analysis result obtained from block 904 is stored with the lookup key in a cache entry of a cache. The cache can be implemented, for example, as a least recently used (LRU) cache, which is a data structure optimized for fast retrieval of values which have been recently stored as opposed to values stored earlier. In some implementations, the cache can be flushed when a new loop-nest is being processed. Alternatively, the cache entries can remain in the cache until the cache is full, at which point, the oldest cache entry is evicted from the cache.

At block 910, the execution statement can be modified according to the analysis result. For example, a predicate simplification such as if-conversion can be applied to the execution statement to incorporate a predicated into the statement itself. As another example, one or more loop statements bounding the execution statement can be modified to reflect the actual iteration space of the execution statement as indicated by the analysis result obtained from block 904.

When a subsequent execution statement is processed, a lookup can be generated from the control statements bounding the subsequent execution statement (e.g., by applying the key generation algorithm to the control statements). If the subsequent execution statement is bounded by the same set of control statements as the execution statement analyzed at block 904, the lookup key generated for the subsequent statement will have the same value and be equal to the lookup key generated at block 906. In such scenarios, the analysis result can be retrieved from the cache entry of the cache corresponding to the lookup key without having to repeat the code analysis, and the subsequent execution statement can be modified according to the analysis result retrieved from the cache.

If the subsequent execution statement is bounded by a different set of control statements as the execution statement analyzed at block 904, the lookup key generated for the subsequent statement will be different than the lookup key generated at block 906. If the lookup key for the subsequent execution statement does not have a corresponding cache entry in the cache, the subsequent execution statement is analyzed to generate an analysis result indicating the set of execution conditions for the subsequent execution statement. This analysis result is stored with the corresponding lookup key in a new cache entry of the cache, and the subsequent execution statement can be modified according to this analysis result.

Figure 10:
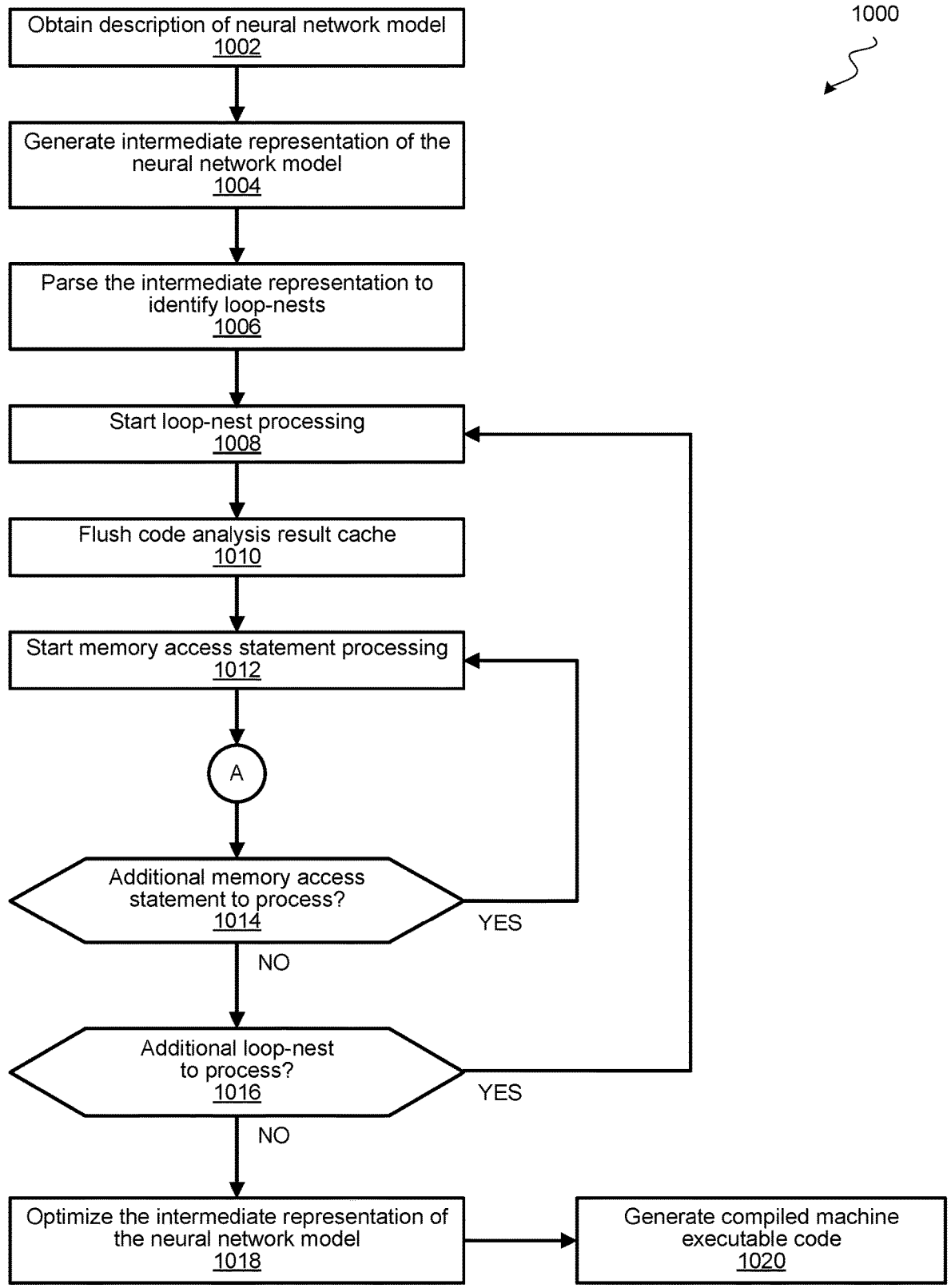
FIG. 10 illustrates a flow diagram of an example of a compiling process.

FIG. 10 illustrates a flow diagram of an example of a process 1000 for compiling a neural network model. Process 1000 can be performed, for example, by a compiler that interprets programming code describing the neural network model, and translates the programming code into machine instructions for execution on hardware (e.g., an integrated circuit device such as an acceleration engine). In some implementations, process 1000 can be implemented on a computer-readable medium that is executable by one or more processors of a computing system to compile the programming code of a neural network model for loading onto the integrated circuit device for execution.

Process 1000 may begin by obtaining a description of a neural network model at block 1002. The description of the neural network model can be, for example, source code written in a high-level programming language, such as Python, Java, C++, among other examples. In some implementations, the description of the neural network model may utilize software libraries tailored for neural networks such as TensorFlow, PyTorch, etc. In some implementations, the description of the neural network model can be obtained from the local storage of the computing system executing the compiler, or from a remote storage over a network interface. A file name or a reference to the description of the neural network model can be provided with a command to invoke the compiler, or can be loaded into the compiler via a user interface.

At block 1004, an intermediate representation (IR) of the neural network model is generated. The IR of the neural network model can be code and/or data structures used internally by the compiler to represent operations and dependencies between the operations. The IR provides an abstraction of the neural network model for the compiler to analyze and optimize the source code. For example, the IR of the neural network model may include code representing a compute graph. The compute graph may include nodes representing operators and edges representing dependencies (e.g., data dependencies) between the operators. An operator can be coded using one or more loop-nests. For example, the computations performed on a tensor can be coded as one or more loops operating across the elements of the tensor. In some implementations, the edges connecting the operators may also include attributes such as a tensor size that is being outputted from the source operator and inputted to a dependent operator.

At block 1006, the IR is parsed to identify loop-nest constructs in the IR. A loop-nest construct is a block of code that contains one or more nested loops. A loop-nest construct can be identified in the IR, for example, by identifying loop statements such as "for" loops ans/or "while" loops, etc. A loop-nest construct can be several layers deep and may iterate through a number of iterator variables. In some implementations, an iterator variable at one level may depend on an iterator variable of another level. A loop-nest is an affine loop-nest if the loop bounds and array references in the loop-nest can be represented using affine functions (linear functions plus a constant) of loop iterators and program parameters.

At block 1008, a loop-nest construct is selected for processing. For example, the loop-nest constructs in the IR can be selected sequentially for processing. At block 1010, the code analysis result (CAR) cache can be flushed at the beginning of processing a loop-nest construct. In some implementations, flushing of the cache can be omitted.

At block 1012, a memory access statement within the selected loop-nest construct is selected for processing. For example, the memory access statements within the selected loop-nest can be selected sequentially for processing. A memory access statement can be processed using process 1100 to be described with reference to FIG. 11 below. Upon competition of processing the selected memory access statement, a determination is made at block 1014 as to whether there are any additional memory access statement to process in the selected loop-nest construct. If there are any additional memory access statement to process, the next memory access statement is selected, and process 1000 returns to block 1012 to start processing of that memory access statement. If all the memory access statements in the selected loop-nest construct have been processed, process 1000 proceeds to block 1016.

At block 1016, a determination is made as to whether there are any additional loop-nest constructs to process in the IR. If there are any additional loop-nest constructs to process, the next loop-nest construct is selected, and process 1000 returns to block 1008 to start processing of that loop-nest construct. If all the loop-nest constructs in the IR have been processed, process 1000 proceeds to block 1018.

At block 1018, the intermediate representation of the neural network model can be optimized based on the processing and analyses performed on the memory access statements in the loop-nest constructs of the IR. The optimizations may include reducing the iteration space specified in the code to the actual iteration space of executing the memory access statements. Memory access statements with similar execution conditions can also be grouped together by rearranging the loop-nest constructs using loop fusion and/or loop fission operations. At block 1020, compiled machine executable code can be generated from the optimized IR by mapping operations in the IR to hardware instructions for a target integrated circuit device (e.g., an acceleration engine).

Figure 11:
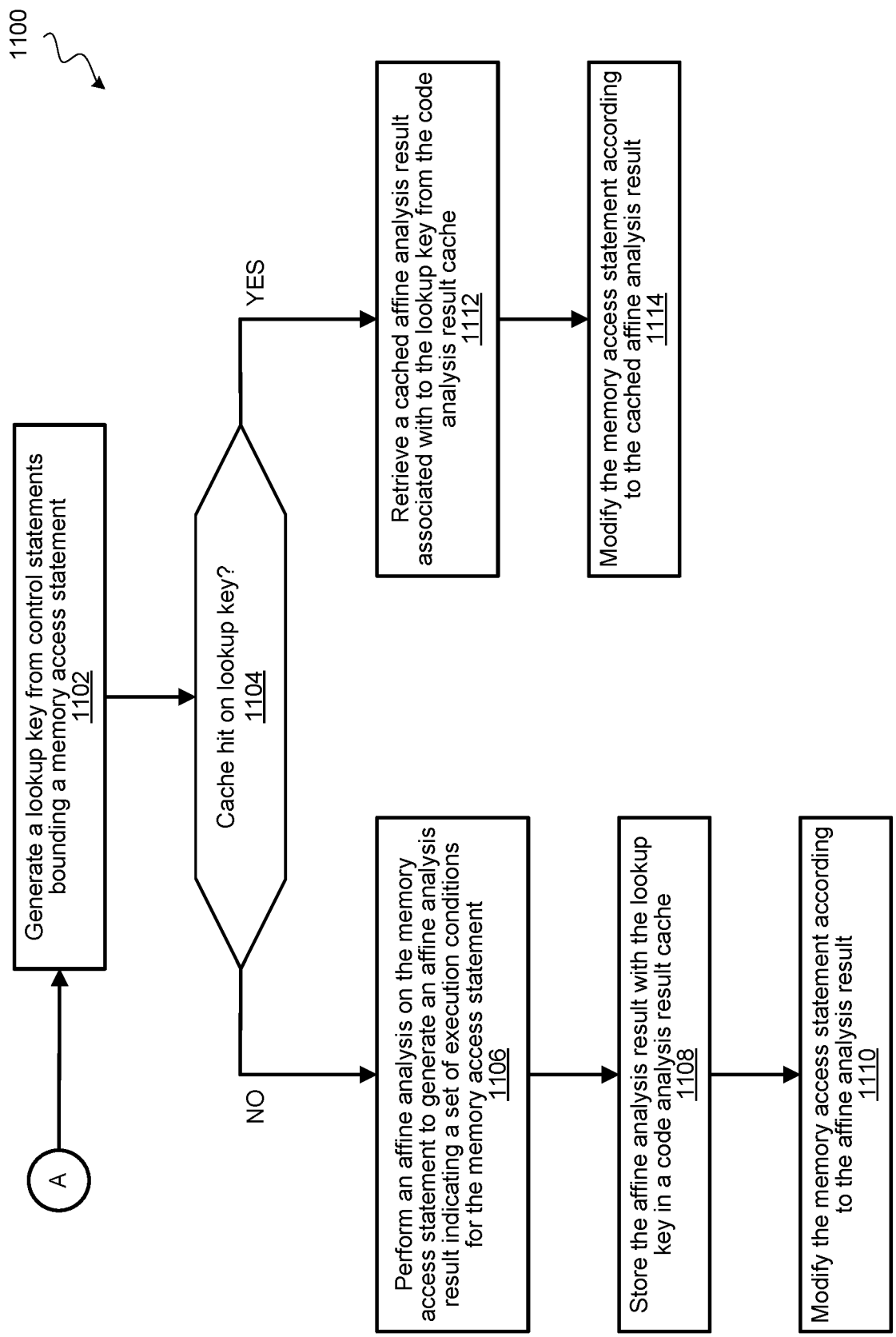
FIG. 11 illustrates a flow diagram of an example of processing a memory access statement.

FIG. 11 illustrates a flow diagram of an example of a process 1100 for processing a memory access statement. Process 1100 can be performed, for example, by a compiler as part of process 1000. In some implementations, process 1100 can be implemented on a computer-readable medium that is executable by one or more processors of a computing system to compile the programming code of a neural network model for loading onto the integrated circuit device for execution.

Process 1100 may begin at block 1102 by generating a lookup key from the control statements bounding the memory access statement being processed. The control statements may include loop statements and any predicate statements that control the execution of the memory access statement. The lookup key can be generated by applying a key generation algorithm to the control statements that the memory access statement is subjected to. The key generation algorithm can be, for example, a hash algorithm such as SHA-256. Memory access statements that are bounded by the same set of control statements are expected to have the same lookup key.

At block 1104, a determination can be made as to whether the lookup key results in a cache hot or a cache miss in the code analysis result cache. For example, process 1100 may traverse through each entry of the cache to determine if the lookup key is present in the cache. If there is no match after traversing the cache, process 1100 can determine that the lookup key results in a cache miss, and processing proceeds to block 1106. If there is a match for the lookup key in the cache, process 1100 can determine that the lookup key results in a cache hit and proceed to block 1112. In some implementations, the code analysis result cache can be implemented as a least recently used (LRU) cache to optimize fast retrieval of values which have been recently stored.

At block 1106, an affine analysis is performed on the memory access statement to generate an affine analysis result indicating a set of execution conditions for the memory access statement. The analysis can be performed, for example, using a polyhedral-based analysis in which a loop iteration space of a n-deep loop-nest is modeled as a n-dimensional convex polyhedron. The set of execution conditions may indicate, for example, an iteration space of the memory access statement, and may include one or more sets of iteration parameters and/or one or more predicate conditions. The iteration space can be expressed as a set of inequalities defining the boundaries and strides of the iteration parameters and predicate conditions.

At block 1108, the affine analysis result is stored with the lookup key as a new cache entry in the code analysis result cache. For example, the code analysis result cache can be implemented using a queue, and the new cache entry can be stored at the beginning of the queue for fast retrieval. Other entries can be shifted down the queue, and a tail entry can be evicted from the queue when the queue is full.

At block 1110, the memory access statement can be modified according to the affine analysis result. For example, a predicate simplification such as if-conversion can be applied to the memory access statement to incorporate a predicated into the memory access statement itself. As another example, one or more loop statements bounding the execution statement can be modified to reflect the actual iteration space of the memory access statement as indicated by the affine analysis result.

Referring back to the determination made at block 1104, if the lookup key for the memory access statement being processed is already in the code analysis result cache, the cached affine analysis result associated with the lookup key is retrieved from the code analysis result cache at block 1112. A cache hit indicates that the memory access statement being processed are bounded by the same set of execution conditions as a previous memory access statement. As such, the affine analysis need not be performed on the current memory access statement being processed, because the affine analysis can be retrieved from the code analysis result cache. This can reduce the compilation time of the neural network model by reducing the amount of code analysis being performed.

At block 1114, the memory access statement can be modified according to the cached affine analysis result. For example, a predicate simplification such as if-conversion can be applied to the memory access statement to incorporate a predicated into the memory access statement itself. As another example, one or more loop statements bounding the execution statement can be modified to reflect the actual iteration space of the memory access statement as indicated by the cached affine analysis result. These modifications can be performed without having to analyze the memory access statement itself because the result of a previous memory access statement can be reused.

Figure 12:
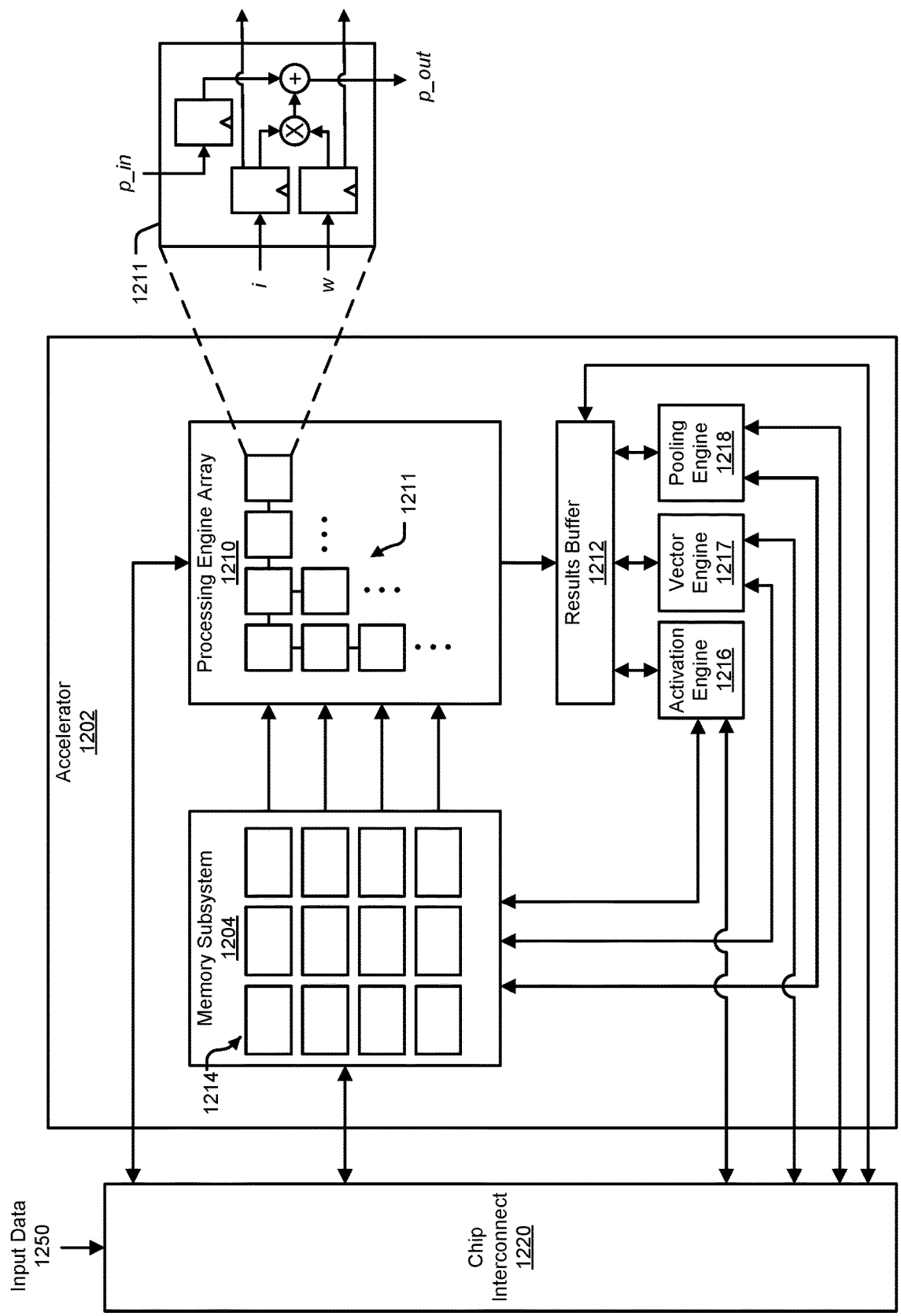
FIG. 12 illustrates a block diagram of an example of an integrated circuit device.

FIG. 12 is a block diagram illustrating an example of an integrated circuit device that can execute the compiled executable code generated from a compiler. The example of FIG. 12 illustrates an accelerator 1202. In various examples, the accelerator 1202, for a set of input data (e.g., input data 1250), can execute computations using a processing engine array 1210, an activation engine 1216, a vector engine 1217, and/or a pooling engine 1218. In some examples, the example accelerator 1202 may be an integrated circuit component of a processor, such as a neural network processor. The processor may have other integrated circuit components, including additional accelerator engines.

In various implementations, the memory subsystem 1204 can include multiple memory banks 1214. In these implementations, each memory bank 1214 can be independently accessible, meaning that the read of one memory bank is not dependent on the read of another memory bank. Similarly, writing to one memory bank does not affect or limit writing to a different memory bank. In some cases, each memory bank can be read and written at the same time.

Various techniques can be used to have independently accessible memory banks 1214. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1204 can permit simultaneous access to the read or write channels of multiple memory banks. As another example, the memory subsystem 1204 can include arbitration logic such that arbitration between, for example, the outputs of multiple memory banks 1214 can result in more than one memory bank's output being used. In these and other examples, though globally managed by the memory subsystem 1204, each memory bank can be operated independently of any other.

Having the memory banks 1214 be independently accessible can increase the efficiency of the accelerator 1202. For example, values can be simultaneously read and provided to each row of the processing engine array 1210, so that the entire processing engine array 1210 can be in use in one clock cycle. As another example, the memory banks 1214 can be read at the same time that results computed by the processing engine array 1210 are written to the memory subsystem 1204. In contrast, a single memory may be able to service only one read or write at a time. With a single memory, multiple clock cycles can be required, for example, to read input data for each row of the processing engine array 1210 before the processing engine array 1210 can be started.

In various implementations, the memory subsystem 1204 can be configured to simultaneously service multiple clients, including the processing engine array 1210, the activation engine 1216, the vector engine 1217, the pooling engine 1218, and any external clients that access the memory subsystem 1204 over a communication fabric 1220. In some implementations, being able to service multiple clients can mean that the memory subsystem 1204 has at least as many memory banks as there are clients. In some cases, each row of the processing engine array 1210 can count as a separate client. In some cases, each column of the processing engine array 1210 can output a result, such that each column can count as a separate write client. In some cases, output from the processing engine array 1210 can be written into the memory banks 1214 that can then subsequently provide input data for the processing engine array 1210. As another example, the activation engine 1216, the vector engine 1217, and the pooling engine 1218 can include multiple execution channels, each of which can be separate memory clients. The memory banks 1214 can be implemented, for example, using static random access memory (SRAM).

In various implementations, the memory subsystem 1204 can include control logic. The control logic can, for example, keep track of the address spaces of each of the memory banks 1214, identify memory banks 1214 to read from or write to, and/or move data between the memory banks 1214. In some implementations, memory banks 1214 can be hardwired to particular clients. For example, a set of memory banks 1214 can be hardwired to provide values to the rows of the processing engine array 1210, with one memory bank servicing each row. As another example, a set of memory banks can be hard wired to receive values from columns of the processing engine array 1210, with one memory bank receiving data for each column.

The processing engine array 1210 is the computation matrix of the example accelerator 1202. The processing engine array 1210 can, for example, execute parallel integration, convolution, correlation, and/or matrix multiplication, among other things. The processing engine array 1210 includes multiple processing engines 1211, arranged in rows and columns, such that results output by one processing engine 1211 can be input directly into another processing engine 1211. Processing engines 1211 that are not on the outside edges of the processing engine array 1210 thus can receive data to operate on from other processing engines 1211, rather than from the memory subsystem 1204.

In various examples, the processing engine array 1210 uses systolic execution, in which data arrives at each processing engine 1211 from different directions at regular intervals. In some examples, input data can flow into the processing engine array 1210 from the left and weight values can be loaded at the top. In some examples weights and input data can flow from the left and partial sums can flow from top to bottom. In these and other examples, a multiply-and-accumulate operation moves through the processing engine array 1210 as a diagonal wave front, with data moving to the right and down across the array. Control signals can be input at the left at the same time as weights, and can flow across and down along with the computation.

In various implementations, the number of columns in the processing engine array 1210 determines the computational capacity of the processing engine array 1210, and the number of rows determines the required memory bandwidth for achieving maximum utilization of the processing engine array 1210. The processing engine array 1210 can have, for example, 64 columns and 128 rows, or some other number of columns and/or rows.

An example of a processing engine 1211 is illustrated in FIG. 12 in an inset diagram. As illustrated by this example, a processing engine 1211 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1211.

In the illustrated example, an input from above can include a partial sum, pin, provided either from another processing engine 1211 or from a previous round of computation by the processing engine array 1210. When starting a computation for a new set of input data, the top row of the processing engine array 1210 can receive a fixed value forp in, such as zero. As illustrated by this example, i and w are multiplied together and the result is summed with p in to produce a new partial sum, pout, which can be input into another processing engine 1211. Various other implementations of the processing engine 1211 are possible.

Outputs from the last row in the processing engine array 1210 can be temporarily stored in the results buffer 1212. The results can be intermediate results, which can be written to the memory banks 1214 to be provided to the processing engine array 1210 for additional computation. Alternatively, the results can be final results, which, once written to the memory banks 1214 can be read from the memory subsystem 1204 over the communication fabric 1220, to be output by the system.

In some implementations, the accelerator 1202 includes an activation engine 1216. In these implementations, the activation engine 1216 can combine the results from the processing engine array 1210 into one or more output activations. For example, for a convolutional neural network, convolutions from multiple channels can be summed to produce an output activation for a single channel. In other examples, accumulating results from one or more columns in the processing engine array 1210 may be needed to produce an output activation for a single node in the neural network. In some examples, activation engine 1216 can be bypassed.

In various examples, the activation engine 1216 can include multiple separate execution channels. In these examples, the execution channels can correspond to the columns of the processing engine array 1210, and can perform an operation on the outputs of a column, the result of which can be stored in the memory subsystem 1204. In these examples, the activation engine 1216 may be able to perform between 1 and n parallel computations, where n is equal to the number of columns in the processing engine array 1210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1202 can include a pooling engine 1218. Pooling is the combining of outputs of the columns of the processing engine array 1210. Combining can include for example, computing a maximum value, a minimum value, an average value, a median value, a summation, a multiplication, or another logical or mathematical combination. In various examples, the pooling engine 1218 can include multiple execution channels that can operating on values from corresponding columns of the processing engine array 1210. In these examples, the pooling engine 1218 may be able to perform between 1 and n parallel computations, where n is equal to the number of columns in the processing engine array 1210. In various examples, execution channels of the pooling engine 1218 can operate in parallel and/or simultaneously. In some examples, the pooling engine 1218 can be bypassed.

In some implementations, the accelerator 1202 can further include a vector engine 1217. Vector engine 1217 is a compute engine that can perform computations and manipulations on values stored in memory subsystem 1204 and/or results buffer 1212 such as values representing matrices of input values, weight values, intermediate results, etc. Vector engine 1217 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 1217 can operate in parallel and/or simultaneously. In some examples, the vector engine 1217 can be bypassed or be omitted.

Herein, the activation engine 1216, the vector engine 1217, and the pooling engine 1218 may be referred to collectively as execution engines. The processing engine array 1210 is another example of an execution engine. Another example of an execution engine is a Direct Memory Access (DMA) engine, which may be located outside the accelerator 1202.

Input data 1250 can arrive over the communication fabric 1220. The communication fabric 1220 can connect the accelerator 1202 to other components of a processor, such as a DMA engine that can obtain input data 1250 from an Input/Output (I/O) device, a storage drive, or a network interface. The input data 1250 can be, for example one-dimensional data, such as a character string or numerical sequence, or two-dimensional data, such as an array of pixel values for an image or frequency and amplitude values over time for an audio signal. In some examples, the input data 1250 can be three-dimensional, as may be the case with, for example, the situational information used by a self-driving car or virtual reality data. In some implementations, the memory subsystem 1204 can include a separate buffer for the input data 1250. In some implementations, the input data 1250 can be stored in the memory banks 1214 when the accelerator 1202 receives the input data 1250.

In some examples, the accelerator 1202 can implement a neural network processing engine. In these examples, the accelerator 1202, for a set of input data 1250, can execute a neural network to perform a task for which the neural network was trained. Executing a neural network on a set of input data can be referred to as inference or performing inference.

The weights for the neural network can be stored in the memory subsystem 1204, along with input data 1250 on which the neural network will operate. The neural network can also include instructions, which can program the processing engine array 1210 to perform various computations on the weights and the input data. The instructions can also be stored in the memory subsystem 1204, in the memory banks 1214 or in a separate instruction buffer. The processing engine array 1210 can output intermediate results, which represent the outputs of individual layers of the neural network. In some cases, the activation engine 1216, the vector engine 1217, and/or pooling engine 1218 may be enabled for computations called for by certain layers of the neural network. The accelerator 1202 can store the intermediate results in the memory subsystem 1204 for inputting into the processing engine array 1210 to compute results for the next layer of the neural network. The processing engine array 1210 can further output final results from a last layer of the neural network. The final results can be stored in the memory subsystem 1204 and then be copied out to host processor memory or to another location.

Figure 13:
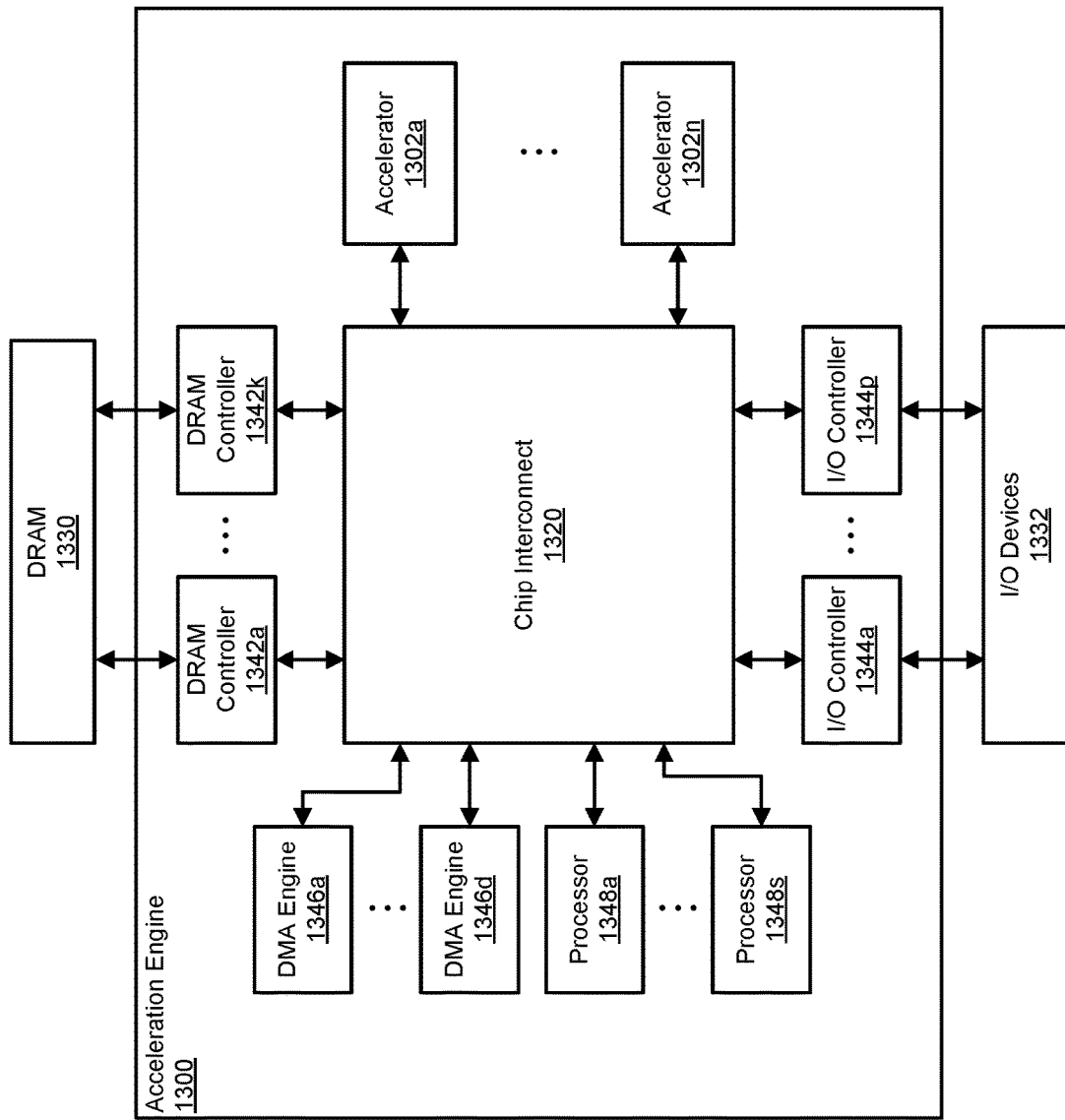
FIG. 13 illustrates a block diagram of an example of an acceleration engine.

FIG. 13 includes a block diagram that illustrates an example of an acceleration engine 1300. The acceleration engine 1300 is an example of an integrated circuit that can include one or more accelerators 1302a-1302n that may be similar to the accelerator illustrated in FIG. 12.

In the example of FIG. 13, the acceleration engine 1300 includes multiple accelerators 1302a-1302n, each of which can perform a set of operations. In various examples, the accelerators 1302a-1302n are for particular types of operations, so that the accelerators 1302a-1302n can perform the operations much faster than when similar operations are performed by a general-purpose processor. In various examples, to perform a set of operations, input data on which the operations are to be performed must first be moved into the accelerators 1302a-1302n. Additionally, in some cases, program code is also moved into the accelerators 1302a-1302n, which programs the operations that the accelerators 1302a-1302n will perform on the data. In the illustrated example, the acceleration engine 1300 includes n accelerators 1302a-1302n. Examples of accelerators that can be included in the acceleration engine 1300 include graphics accelerators, floating point accelerators, neural network accelerators, and others. In various examples, the accelerators 1302a-1302n can each be the same (e.g., each of the is a graphics accelerator) or can be different (e.g., the accelerators 1302a-1302n include a graphics accelerator, a floating point accelerator, and neural network accelerator).

The example acceleration engine 1300 further includes DRAM controllers 1342a-1342k for communicating with an external memory. The external memory is implemented, in this example, using DRAM 1330. In the illustrated example, the acceleration engine 1300 includes k DRAM controllers 1342a-1342k, each of which may be able to communicate with an independent set of banks of DRAM. In other examples, other types of RAM technology can be used for the external memory. The DRAM controllers 1342a-1342k can also be referred to as memory controllers.

In various examples, input data and/or program code for the accelerators 1302a-1302n can be stored in the DRAM 1330. Different programs can cause the accelerators 1302a-1302n to perform different operations. For example, when one of the accelerators is a neural network accelerator, one program can configure the neural network accelerator to perform speech recognition while another program can configure the neural network accelerator to perform image recognition. In various examples, different accelerators 1302a-1302n can be programmed with different programs, so that each performs a different set of operations. In various examples, the processors 1348a-1348s can manage moving of program code from the DRAM 1330 to the accelerators 1302a-1302n.

The example acceleration engine 1300 further includes I/O controllers 1344a-1344p for communicating with I/O devices 1332 in the system. The acceleration engine 1300 can communicate with I/O devices over, for example, a processor bus. In some examples, the processor bus can be implemented using Peripheral Component Interconnect (PCI) and/or a variation of the PCI bus protocol. The processor bus can connect the acceleration engine 1300 to I/O devices such as, for example, input and output devices, memory controllers, storage devices, and/or network interface cards, among other things. In some examples, the I/O controllers 1344-1344p can enable the acceleration engine 1300 to act as an I/O device for a host processor. For example, the acceleration engine 1300 can be the recipient of input data from the host processor, and a command indicating an operation to be performed on the input data (e.g., a particular computation or analysis). In the illustrated example, the acceleration engine 1300 includes p I/O controllers 1344a-1344p, each of which may include a separate root complex and may communicate with a separate set of I/O devices 1332. In other examples, other standardized bus protocols, such as Ultra Path Interconnect (UPI) can be used for the host bus. In other examples, a proprietary bus protocol can be used.

Movement of data in the acceleration engine 1300 can be managed by one or more processors 1348a-1348s, which can also be referred to as data management processors. In the example of FIG. 13, the acceleration engine 1300 includes s processors 1348a-1348s incorporated into the device (e.g., on the same silicon die). In other examples, the processors 1348a-1348s can be external to the acceleration engine 1300 (e.g., on a different die and/or in a different package). In some examples, the processors 1348a-1348s can manage the movement of data from I/O devices 1332 to the accelerators 1302a-1302n or the DRAM 1330. For example, input data may be located at an I/O device 1332 or in processor memory, and the processors 1348a-1348s can move the input from the I/O device 1332 or processor memory into an accelerator or into DRAM 1330. As another example, program code for the accelerators 1302a-1302n may be located on an I/O device 1332 or in processor memory.

The example acceleration engine 1300 further includes DMA engines 1346a-1346d that can move data between the accelerators 1302a-1302n, DRAM controllers 1342a-1342k, and I/O controllers 1344a-1344p. In the illustrated example, the acceleration engine 1300 includes d DMA engines 1346a-1346d. In some implementations, the DMA engines 1346a-1346d can be assigned to specific tasks, such as moving data from the DRAM controllers 1342a-1342d to the accelerators 1302a-1302n, or moving data between the I/O controllers 1344a-1344p and the accelerators 1302a-1302n. These tasks can be assigned, for example, by enqueueing descriptors with the DMA engines 1346a-1346d, where a descriptor identifies an address for a block of data and an operation (e.g., a read or a write) to perform. A descriptor, for example, can direct a DMA engine to instruct a DMA controller to read a block of data from DRAM 1330. A descriptor can, as a further example, instruct the DMA engine to write data, read by the DMA controller, to an accelerator. Further descriptors can be used to move data from an accelerator to DRAM 1330.

In various examples, each of the processors 1348a-1348s can be responsible for managing the data movement for a different accelerator. In some examples, a processor may manage the data movement for more than one accelerator. Similarly, in various examples, each of the processors 1348a-1348s can be assigned to one or more DMA engines 1346a-1346d. In these and other examples, associations between processors 1348a-1348s, accelerators 1302a-1302n, and DMA engines 1346a-1346d are determined by program code being executed by each respective processor.

In the example acceleration engine 1300, the various components can communicate over a chip interconnect 1320. The chip interconnect 1320 primarily includes wiring for routing data between the components of the acceleration engine 1300. In some cases, the chip interconnect 1320 can include a minimal amount of logic, such as multiplexors to control the direction of data, flip-flops for handling clock domain crossings, and timing logic.

Figure 14:
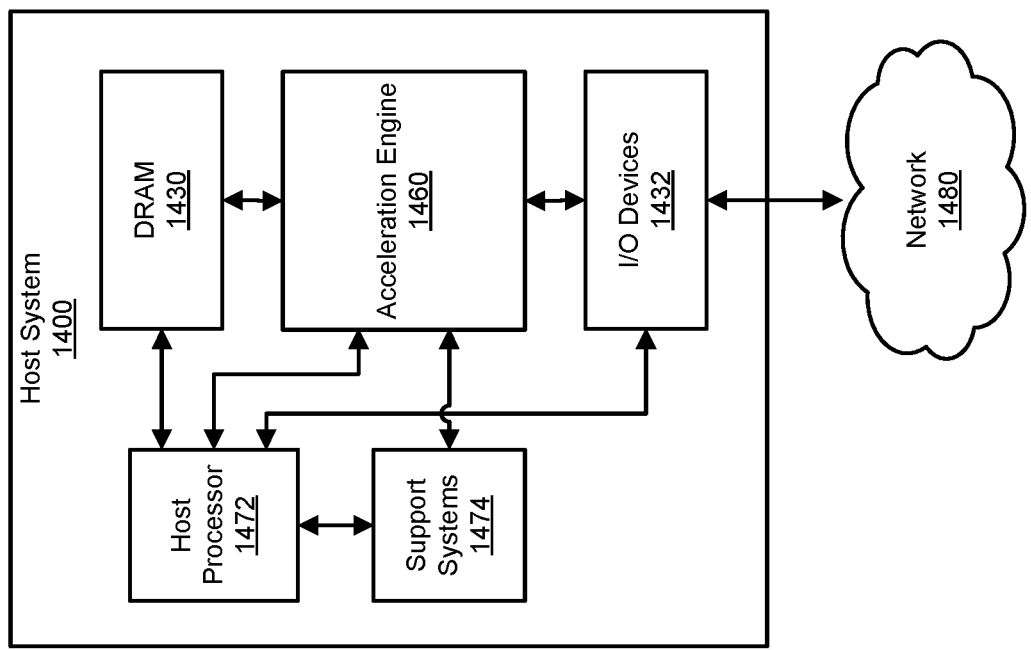
FIG. 14 illustrates a block diagram of an example of a host system.

FIG. 14 includes a block diagram that illustrates an example of a host system 1400 in which an acceleration engine 1460 can be used. The acceleration engine 1460 of FIG. 14 is an example of a device that can include one or more accelerators such as is illustrated in FIG. 13. The example host system 1400 of FIG. 14 includes the acceleration engine 1460, a host processor 1472, DRAM 1430 or processor memory, I/O devices 1432, and support systems 1474. In various implementations, the host system 1400 can include other hardware that is not illustrated here.

The host processor 1472 is a general-purpose integrated circuit that is capable of executing program instructions. In some examples, the host processor 1472 can include multiple processing cores. A multi-core processor may include multiple processing units within the same processor. In some examples, the host system 1400 can include more than one host processor 1472. In some examples, the host processor 1472 and the acceleration engine 1460 can be one chip, such as, one or more integrated circuits within the same package.

In various examples, the host processor 1472 can communicate with other components in the host system 1400 over one or more communication channels. For example, the host system 1400 can include a host processor bus, which the host processor 1472 can use to communicate with the DRAM 1430, for example. As another example, the host system 1400 can include an I/O bus, such as a PCI-based bus, over which the host processor 1472 can communicate with the acceleration engine 1460 and/or the I/O devices 1432, for example. In various examples, the host system 1400 can, alternatively or additionally, include other communication channels or busses, such as serial busses, power management busses, storage device busses, and so on.

In some examples, software programs executing on the host processor 1472 can receive or generate input for processing by the acceleration engine 1460. In some examples, the programs can select an appropriate neural network to execute for a given input. For example, a program may be for language translation, and can select one or more neural networks capable of speech recognition and/or machine translation. In these and other examples, the programs can configure the acceleration engine 1460 with the neural network to execute, and/or can select a neural network processing engine on the acceleration engine 1460 that has previously been configured to execute the desired neural network. In some examples, once the acceleration engine 1460 has started an inference on input data, the host processor 1472 can manage the movement of data (such as weights, instructions, intermediate results, results of conditional layers, and/or final results) into or out of the acceleration engine 1460.

In some examples, a software program that is using the acceleration engine 1460 to conduct an inference can read the result from a conditional layer from the acceleration engine 1460 and/or from a storage location, such as in DRAM 1430. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1430 is memory that is used by the host processor 1472 for storage of program code that the host processor 1472 is in the process of executing, as well as values that are being operated on. In some examples, the data for a neural network (e.g., weight values, instructions, and other data) can be all or partially stored in the DRAM 1430. DRAM is a common term for processor memory, and though DRAM is volatile memory, processor memory can be volatile and/or non-volatile. Though not illustrated here, the host system 1400 can include other volatile and non-volatile memories for other purposes. For example, the host system 1400 can include a Read-Only Memory (ROM) that stores boot code for booting the host system 1400 at power on, and/or Basic Input/Output System (BIOS) code.

Though not illustrated here, the DRAM 1430 can store instructions for various programs, which can be loaded into and be executed by the host processor 1472. For example, the DRAM 1430 can be storing instructions for an operating system, one or more data stores, one or more application programs, one or more drivers, and/or services for implementing the features disclosed herein.

The operating system can manage and orchestrate the overall operation of the host system 1400, such as scheduling tasks, executing applications, and/or controller peripheral devices, among other operations. In some examples, a host system 1400 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1400. For example, some drivers can provide communication between the operating system and peripheral devices or I/O devices 1432. Alternatively or additionally, some drivers may provide communication between application programs and the operating system, and/or application programs and peripheral devices accessible to the host system 1400. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1432 can include hardware for connecting to user input and output devices, such as keyboards, mice, pens, tablets, voice input devices, touch input devices, displays or monitors, speakers, and printers, among other devices. The I/O devices 1432 can also include storage drives and/or network interfaces for connecting to a network 1480. For example, the host system 1400 can use a network interface to communicate with storage devices, user terminals, other computing devices or servers, and/or other networks, among various examples.

In various examples, one or more of the I/O devices 1432 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1400 or may be in an external enclosure. A storage device can be fixed (e.g., attached by screws) or removable (e.g., having a physical release mechanism and possibly a hot-plug mechanism).

Storage devices, the DRAM 1430, and any other memory component in the host system 1400 are examples of computer-readable storage media. Computer-readable storage media are physical mediums that are capable of storing data in a format that can be read by a device such as the host processor 1472. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1432 can be PCI-based devices. In these examples, a PCI-based I/O device includes a PCI interface for communicating with the host system 1400. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-My allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1474 can include hardware for coordinating the operations of the acceleration engine 1460. For example, the support systems 1474 can include a microprocessor that coordinates the activities of the acceleration engine 1460, including moving data around on the acceleration engine 1460. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1472. In some examples, the program executed by the microprocessor is stored on the hardware of microprocessor, or on a non-volatile memory chip in the host system 1400. In some examples, the microprocessor and the acceleration engine 1460 can be on chip, such as one integrated circuit on the same die and in the same package.

In some examples, the support systems 1474 can be responsible for taking instructions from the host processor 1472 when programs executing on the host processor 1472 request the execution of a neural network. For example, the host processor 1472 can provide the support systems 1474 with a set of input data and a task that is to be performed on the set of input data. In this example, the support systems 1474 can identify a neural network that can perform the task, and can program the acceleration engine 1460 to execute the neural network on the set of input data. In some examples, the support systems 1474 only needs to select an appropriate neural network processing engine of the neural network processor. In some examples, the support systems 1474 may need to load the data for the neural network onto the acceleration engine 1460 before the acceleration engine 1460 can start executing the neural network. In these and other examples, the support systems 1474 can further receive the output of executing the neural network, and provide the output back to the host processor 1472.

In some examples, the operations of the support systems 1474 can be handled by the host processor 1472. In these examples, the support systems 1474 may not be needed and can be omitted from the host system 1400.

In various examples, the host system 1400 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1400 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for compiling a neural network model, the method comprising:
   obtaining a description of the neural network model;
   generating an intermediate representation of the neural network model;
   parsing the intermediate representation to identify loop-nest constructs;
   for each of the loop-nest constructs:
      flushing a code analysis result cache; and
      for each memory access statement in the loop-nest construct:
         generating a lookup key from control statements bounding the memory access statement;
         determining whether the lookup key is stored in an entry of the code analysis result cache;

if the lookup key results in a cache miss:
  performing an affine analysis on the memory access statement to generate an affine analysis result for the memory access statement, the affine analysis result indicating a set of execution conditions for the memory access statement;
  storing the affine analysis result with the lookup key in the code analysis result cache; and
  modifying the memory access statement according to the affine analysis result; and
if the lookup key results in a cache hit:
  retrieving a cached affine analysis result associated with the lookup key from the code analysis result cache; and
  modifying the memory access statement according to the cached affine analysis result;
optimizing the intermediate representation of the neural network model based on the modified memory access statement; and
compiling the optimized intermediate representation of the neural network model into machine executable code.

2. The computer-implemented method of claim 1, wherein the set of execution conditions represents an iteration space of the memory access statement.

3. The computer-implemented method of claim 1, wherein the lookup key is generated by applying a hash function to the control statements bounding the memory access statement.

4. The computer-implemented method of claim 1, wherein the code analysis result cache uses a least recently used policy to evict a least recently used entry first.

5. A computer-implemented method comprising:
parsing a loop-nest construct;
analyzing an execution statement in the loop-nest construct to generate an analysis result indicating a set of execution conditions for the execution statement, the set of execution conditions including an iteration space of the execution statement and one or more algebraic inequalities to describe a predicate condition;
generating a first lookup key from control statements bounding the execution statement;
storing the analysis result with the first lookup key in a first cache entry of a cache;
modifying the execution statement according to the analysis result, wherein modifying the execution statement includes performing a predicate simplification; and
compiling the loop-nest construct with the modified execution statement into machine executable code.

6. The computer-implemented method of claim 5, further comprising:
generating a second lookup key for a subsequent execution statement from control statements bounding the subsequent execution statement, the second lookup key being equal to the first lookup key;
retrieving the analysis result from the first cache entry of the cache corresponding to the first lookup key; and
modifying the subsequent execution statement according to the analysis result.

7. The computer-implemented method of claim 5, further comprising:
generating a second lookup key from control statements bounding a subsequent execution statement;
determining that the second lookup key does not have a corresponding cache entry in the cache;
analyzing the subsequent execution statement to generate a second analysis result indicating a second set of execution conditions for the subsequent execution statement;
storing the second analysis result with the second lookup key in a second cache entry of the cache; and
modifying the subsequent execution statement according to the second analysis result.

8. The computer-implemented method of claim 5, wherein the cache uses a least recently used cache policy.

9. The computer-implemented method of claim 5, wherein the execution statement is a memory access statement.

10. The computer-implemented method of claim 5, wherein the loop-nest construct is an affine loop-nest.

11. The computer-implemented method of claim 5, wherein the execution statement is a data transformation operation.

12. The computer-implemented method of claim 5, wherein the predicate condition is a function of a loop variable of the loop-nest construct.

13. A non-transitory computer readable medium having stored therein instructions that, when executed by one or more processors, cause the one or more processors to execute a compiler, the compiler performing operations including:
parsing a loop-nest construct;
analyzing an execution statement in the loop-nest construct to generate an analysis result indicating a set of execution conditions for the execution statement, the set of execution conditions including an iteration space of the execution statement and one or more algebraic inequalities to describe a predicate condition;
generating a first lookup key from control statements bounding the execution statement;
storing the analysis result with the first lookup key in a first cache entry of a cache;
modifying the execution statement according to the analysis result, wherein modifying the execution statement includes performing a predicate simplification; and
compiling the loop-nest construct with the modified execution statement into machine executable code.

14. The non-transitory computer readable medium of claim 13, wherein the operations further include:
generating a second lookup key for a subsequent execution statement from control statements bounding the subsequent execution statement, the second lookup key being equal to the first lookup key;
retrieving the analysis result from the first cache entry of the cache corresponding to the first lookup key; and
modifying the subsequent execution statement according to the analysis result.

15. The non-transitory computer readable medium of claim 13, wherein the operations further include:
generating a second lookup key from control statements bounding a subsequent execution statement;
determining that the second lookup key does not have a corresponding cache entry in the cache;
analyzing the subsequent execution statement to generate a second analysis result indicating a second set of execution conditions for the subsequent execution statement;
storing the second analysis result with the second lookup key in a second cache entry of the cache; and
modifying the subsequent execution statement according to the second analysis result.

16. The non-transitory computer readable medium of claim 13, wherein the cache uses a least recently used cache policy.

17. The non-transitory computer readable medium of claim 13, wherein the execution statement is a memory access statement.

18. The non-transitory computer readable medium of claim 13, wherein the loop-nest construct is an affine loop-nest.

19. The non-transitory computer readable medium of claim 13, wherein the execution statement is a data transformation operation.

20. The non-transitory computer readable medium of claim 13, wherein the predicate condition is a function of a loop variable of the loop-nest construct.

* * * * *